US012688876B2

(12) United States Patent
Hong et al.

(10) Patent No.: US 12,688,876 B2
(45) Date of Patent: Jul. 21, 2026

(54) HIGHLIGHT VIDEO GENERATION

(71) Applicant: Google LLC, Mountain View, CA (US)

(72) Inventors: Wei Hong, Sunnyvale, CA (US); Li Wei, Mountain View, CA (US); Michelle Chen, Sommerville, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/869,184

(22) PCT Filed: Jun. 17, 2022

(86) PCT No.: PCT/US2022/073030
§ 371 (c)(1),
(2) Date: Nov. 25, 2024

(87) PCT Pub. No.: WO2023/244272
PCT Pub. Date: Dec. 21, 2023

(65) Prior Publication Data
US 2026/0004813 A1 Jan. 1, 2026

(51) Int. Cl.
*G11B 27/031* (2006.01)
*G06V 20/40* (2022.01)
(52) U.S. Cl.
CPC ............ *G11B 27/031* (2013.01); *G06V 20/47* (2022.01)
(58) Field of Classification Search
CPC .............................. G11B 27/031; G06V 20/47
See application file for complete search history.

(56) References Cited

U.S. PATENT DOCUMENTS

| | | |
|---|---|---|
| 2008/0019661 A1 | 1/2008 | Obrador |
| 2010/0020224 A1* | 1/2010 | Hattori ................. H04N 23/611 |
| | | 382/224 |
| 2014/0023348 A1 | 1/2014 | O'Kelly |
| 2015/0078680 A1 | 3/2015 | Shakib |

(Continued)

OTHER PUBLICATIONS

International Searching Authority, International Search Report and Written Opinion mailed Feb. 6, 2023, issued in connection with International Patent Application No. PCT/US2022/073030, filed Jun. 17, 2022, 16 pages.

(Continued)

*Primary Examiner* — Gelek W Topgyal
(74) *Attorney, Agent, or Firm* — McDonnell Boehnen Hulbert & Berghoff LLP

(57) ABSTRACT
A method includes obtaining a video having image frames, and determining, for each respective image frame, a corresponding frame content score based on a visual content thereof. The method also includes selecting, from the image frames, a plurality of video clips, where each respective video clip includes a plurality of consecutive image frames and is selected based on the corresponding frame content scores of the plurality of consecutive image frames thereof. The method additionally includes determining, for each respective video clip, a corresponding clip content score based on the corresponding frame content scores of the plurality of consecutive image frames thereof. The method further includes generating a highlight video that includes the plurality of video clips and a representation of a ranking of the plurality of video clips, where the ranking is based on the corresponding clip content score of each respective video clip.

20 Claims, 5 Drawing Sheets

(56) References Cited

U.S. PATENT DOCUMENTS

| | | | |
|---|---|---|---|
| 2016/0071549 A1 | 3/2016 | von Sneidern | |
| 2017/0034444 A1 | 2/2017 | Song | |
| 2017/0339388 A1 | 11/2017 | Johar | |
| 2019/0110002 A1 | 4/2019 | Zhang | |
| 2020/0204440 A1* | 6/2020 | Viswanathan | H04N 23/61 |
| 2020/0228708 A1 | 7/2020 | Hong | |
| 2020/0365188 A1 | 11/2020 | Brinkman, Jr. | |
| 2022/0004773 A1* | 1/2022 | Son | G06N 3/0464 |
| 2022/0122639 A1 | 4/2022 | Townsend | |
| 2022/0358966 A1* | 11/2022 | Wang | H04N 21/8106 |

OTHER PUBLICATIONS

Brightcove, "Creating a Video Clip Using the Live Module" Retrieved on Nov. 25, 2024 from https://live.support.brightcove.com/live-module/creating-video-clip-using-live-module.html.

Chaudhari et al., "Real time video processing and object detection on android smartphone," 2015 International Conference on Electrical, Electronics, Signals, Communication and Optimization, Jan. 2015.

Google Operating System, "Auto Awesome Action, Eraser and Movie," Published Oct. 29, 2013, Retrieved from https://googlesystem.blogspot.com/2013/10/auto-awesome-action-eraser-and-movie.html.

Casey Newton, "Google Photos adds themed 'concept movies' and in-app sharing," Published Sep. 19, 2016, Retrieved from https://www.theverge.com/2016/9/19/12945572/google-photos-concept-movies-in-app-sharing.

Youtube Help, "Add video thumbnails on YouTube" Retrieved on Nov. 25, 2024 from https://support.google.com/youtube/answer/72431?hl=en&co=GENIE.Platform%3DAndroid.

Pixel Camera Help, "Take photos & pick your best shot with Top Shot," Retrieved on Nov. 25, 2025 from https://support.google.com/pixelcamera/answer/9937175?hl=en.

* cited by examiner

FRONT VIEW                RIGHT SIDE VIEW                BACK VIEW

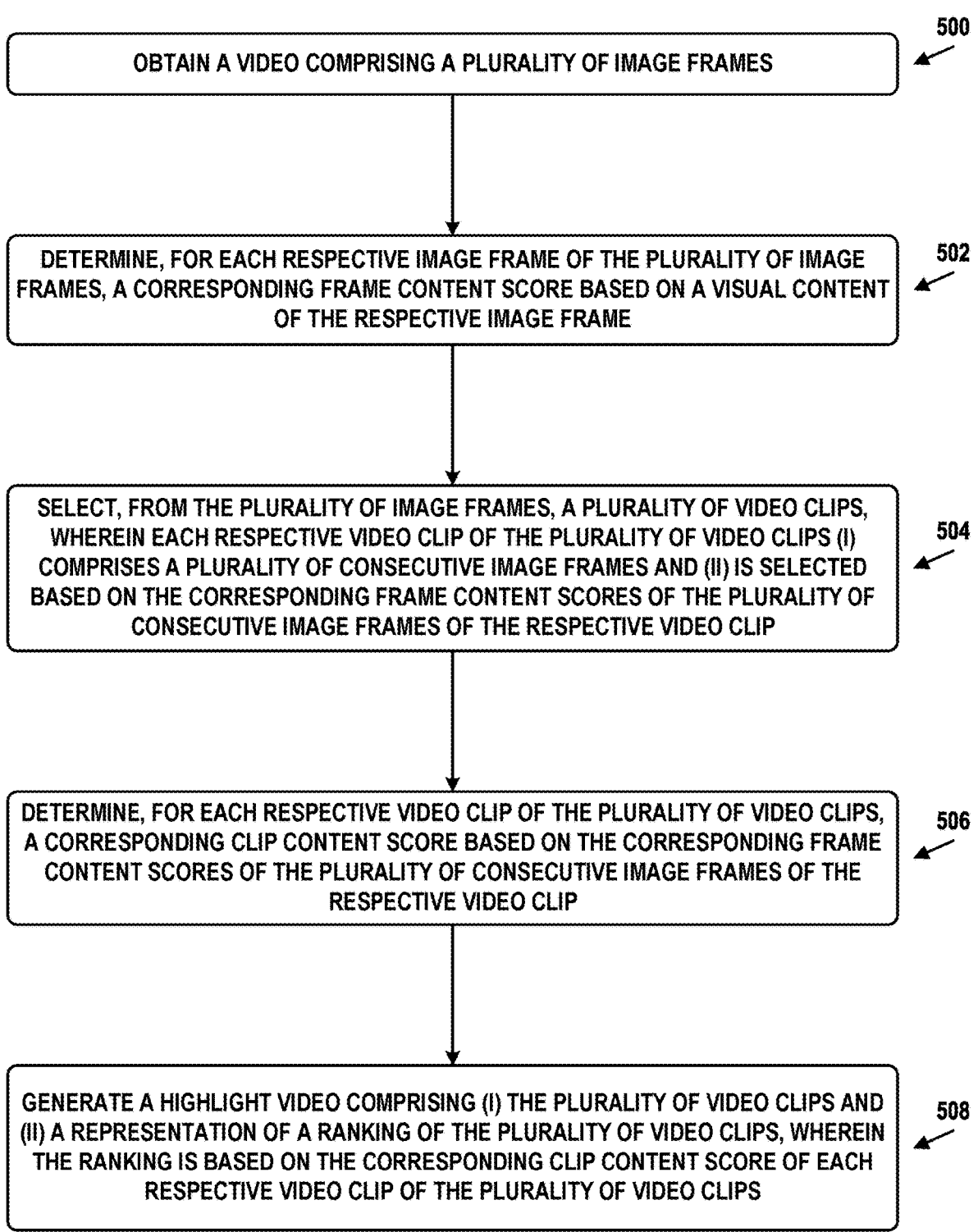

500

OBTAIN A VIDEO COMPRISING A PLURALITY OF IMAGE FRAMES

502

DETERMINE, FOR EACH RESPECTIVE IMAGE FRAME OF THE PLURALITY OF IMAGE FRAMES, A CORRESPONDING FRAME CONTENT SCORE BASED ON A VISUAL CONTENT OF THE RESPECTIVE IMAGE FRAME

504

SELECT, FROM THE PLURALITY OF IMAGE FRAMES, A PLURALITY OF VIDEO CLIPS, WHEREIN EACH RESPECTIVE VIDEO CLIP OF THE PLURALITY OF VIDEO CLIPS (I) COMPRISES A PLURALITY OF CONSECUTIVE IMAGE FRAMES AND (II) IS SELECTED BASED ON THE CORRESPONDING FRAME CONTENT SCORES OF THE PLURALITY OF CONSECUTIVE IMAGE FRAMES OF THE RESPECTIVE VIDEO CLIP

506

DETERMINE, FOR EACH RESPECTIVE VIDEO CLIP OF THE PLURALITY OF VIDEO CLIPS, A CORRESPONDING CLIP CONTENT SCORE BASED ON THE CORRESPONDING FRAME CONTENT SCORES OF THE PLURALITY OF CONSECUTIVE IMAGE FRAMES OF THE RESPECTIVE VIDEO CLIP

508

GENERATE A HIGHLIGHT VIDEO COMPRISING (I) THE PLURALITY OF VIDEO CLIPS AND (II) A REPRESENTATION OF A RANKING OF THE PLURALITY OF VIDEO CLIPS, WHEREIN THE RANKING IS BASED ON THE CORRESPONDING CLIP CONTENT SCORE OF EACH RESPECTIVE VIDEO CLIP OF THE PLURALITY OF VIDEO CLIPS

Figure 5

HIGHLIGHT VIDEO GENERATION

CROSS-REFERENCE TO RELATED APPLICATIONS

The present application is a National Stage Application under 35 U.S.C. § 371 and claims priority to International Patent Application No. PCT/US2022/073030, filed Jun. 17, 2022, and titled "Highlight Video Generation," which is incorporated herein by reference in its entirety.

BACKGROUND

A video may be edited using video editing software by adding, removing, and/or rearranging portions thereof to achieve a desired effect. However, video editing may rely on a user providing manual inputs to the editing software to control the editing process and/or the resulting edited video. Learning to use the video editing software may be challenging and/or time consuming for some users, and therefore might not be accessible to some potential users. Thus, the amount of video footage that can be edited by a user may be limited by the user's skill level and/or available time. Accordingly, it is desirable to automate parts of the video editing process.

SUMMARY

A video may be summarized by generating a shorter highlight video that includes video clips selected from the video. The video clips may be selected by quantifying, or scoring, a quality of different parts of the video. For example, the quality of a video clip may be quantified using a total clip quality score, which may be based on (i) a clip content score that represents the amount of particular visual and/or aural features present in the video clip and/or (ii) a clip diversity score that represents a diversity of the video clip relative to other parts of the video. The video clips may be ranked according to the total clip quality scores thereof. The highlight video may include the video, a representation of the ranking of the selected video clips, and respective start and end times for each video clip. Thus, the highlight video may allow for playback of the original video, and/or playback of the selected video clips either in chronological order or an order of the ranking. The highlight video may be generated using relatively low-complexity algorithms, such that the highlight video may appear to be generated in parallel with, concurrently with, and/or immediately after capture of the video, thus simulating real-time operation.

In a first example embodiment, a method may include obtaining a video that includes a plurality of image frames. The method may also include determining, for each respective image frame of the plurality of image frames, a corresponding frame content score based on a visual content of the respective image frame. The method may additionally include selecting, from the plurality of image frames, a plurality of video clips. Each respective video clip of the plurality of video clips may (i) include a plurality of consecutive image frames and (ii) be selected based on the corresponding frame content scores of the plurality of consecutive image frames of the respective video clip. The method may further include determining, for each respective video clip of the plurality of video clips, a corresponding clip content score based on the corresponding frame content scores of the plurality of consecutive image frames of the respective video clip. The method may yet further include generating a highlight video that includes (i) the plurality of video clips and (ii) a representation of a ranking of the plurality of video clips, wherein the ranking is based on the corresponding clip content score of each respective video clip of the plurality of video clips.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 illustrates a flow chart, in accordance with examples described herein.

DETAILED DESCRIPTION

Figure 1:
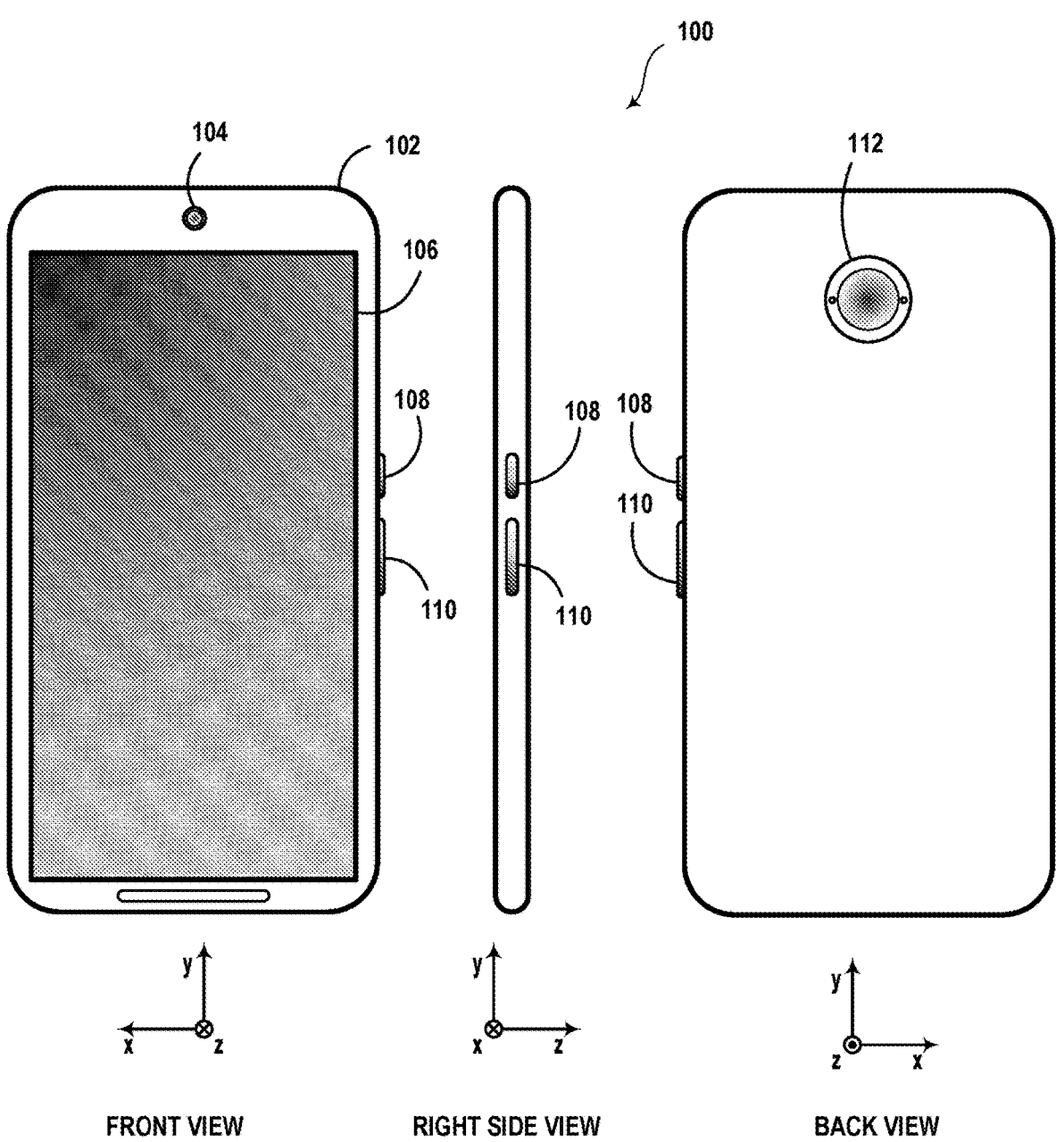
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order Unless otherwise noted, figures are not drawn to scale.

I. Overview

A highlight video may be generated that summarizes a video by identifying, within the video, video clips that are of higher quality than other parts of the video. A quality of each respective video clip of the video clips in the video may be determined based on visual and/or aural contents of the respective video clip, and may be quantitatively represented using a corresponding total clip quality score. The corresponding total clip quality score may be based on (i) a clip content score that rewards and/or penalized the presence of particular visual and/or aural content within the respective video clip and/or (ii) a clip diversity score that represents how much the visual and/or aural content of the respective video clip differs from other parts of the video. For example, the corresponding total clip quality score may be a weighted sum of (i) the clip content score and (ii) the clip diversity score.

Video clips may be selected from the video by determining frame content scores for image frames of the video. The frame content score of a respective image frame may be based on the visual features present within the respective image frame and/or aural features present in corresponding audio data. Specifically, the presence of desirable predetermined visual (e.g., faces, animals, motion, etc.) and/or aural (e.g., clapping, laughter, etc.) features may increase the frame content score, while the presence of undesirable visual (e.g., motion blurring, defocus blurring, etc.) and/or aural (e.g., microphone saturation) features may decrease the frame content score. The clip content score of a respective video clip may be based on (e.g., a weighted average of) the frame content scores of the images frames that form the respective video clip. The clip content score of a respective video clip may be based on the visual and/or aural features of the image frames thereof, and may be independent of a context of the respective video clip within the video.

The set of predetermined features used to generate the frame content score may, in some cases, be modifiable, thus allowing different predetermined features to be used with respect to different users, user groups, and/or videos. Thus, the same video could result in different highlight videos when processed according to the different settings of different users.

The start time of a video clip may be identified based on the frame content score crossing above a threshold content score, and an end time of the video clip may be identified based on the frame content score subsequently crossing below the threshold content score. The value of the threshold content score may be adjusted to control a duration and/or quality of the identified video clips. For example, a higher value of the threshold content score may result in video clips of shorter duration and higher quality (due to the frame content scores of fewer image frames exceeding the higher threshold content score), while a lower value of the threshold content score may result in video clips of longer duration and lower quality (due to the frame content scores of more image frames exceeding the lower threshold content score).

The clip diversity score of a respective video clip may be based on a distance between (i) a clip diversity embedding of the respective video clip and (ii) the clip diversity embeddings of other video clips in the video. The clip diversity embedding of the respective video clip may provide a compressed latent space representation (e.g., a vector or matrix) of the respective video clip, and may be based on one or more frame diversity embeddings of the image frames that form the respective video clip. Thus, the clip diversity score may quantify the additional visual and/or aural variety contributed to the highlight video by the respective video clip, and may thus account for the context in which the respective video clip is captured.

A respective video clip may be ranked relative to other video clips based on the total clip quality score thereof. Specifically, the video clips may be ranked from a highest-scoring video clip to a lowest-scoring video clip. In one implementation, a file representing the highlight video may include the video, a representation of the ranking of the video clips identified within the video, and, for each respective video clip, a corresponding start time and end time of the respective video clip. Thus, the highlight video file may be used to play the video in its original form (i.e., chronologically and in its entirety), and/or play the video clips identified in the video.

The highlight video may allow the video clips of the video to be played in chronological order, or in an order of the ranking. The playback order of the video clips may depend, for example, on a user selection of a playback mode. When played chronologically, the highlight video may be configured to display the video clips in the original order in which they appear in the video. When played according to the ranking, the highlight video may be configured to display the video clips according to their respective qualities, as indicated by the ranking, rather than according to the original chronological order, such that high-ranked video clips are displayed before low-ranked video clips.

Accordingly, the highlight video may provide a summary of the relatively higher-quality parts of the video, while omitting relatively lower-quality parts of the video. The relatively higher-quality parts of the video may include portions thereof that are objectively more notable and/or important. Additionally, the relatively higher-quality parts of the video may be more illustrative, predictive, and/or representative of the video than other parts of the video, and may thus provide a more accurate summary of the video.

Since the highlight video is generated by objectively quantifying the visual and/or aural contents of the video, the highlight video may be generated automatically. Accordingly, generating the highlight video in this manner may reduce video editing time, and/or reduce or eliminate dependence on manual control of the video editing process. Additionally, the highlight video may be generated using relatively low-complexity algorithms. For example, the complexity and/or number of operations executed in order to determine the clip content score and/or the clip diversity score may be selected to allow the highlight video to be generated in parallel with, concurrently with, and/or immediately after generation of the video. This may allow for simulation of real-time operation, and/or may reduce consumption of a device's power and/or computing resources. Thus, in some implementations, the operations discussed herein may be executed on mobile devices and/or other power-limited and/or energy-limited devices. Further, in implementations where generating the highlight video involves keeping the high-quality parts of a video, and discarding low-quality parts of the video (rather than storing the entirety thereof), generating the highlight video produces memory savings while providing an accurate summary of the video.

In some implementations, a user interface may be configured to allow a user to toggle between playing the video in its original form, playing the video clips of the highlight video chronologically, and/or playing the video clips of the highlight video according to the ranking. Additionally or alternatively, some user interfaces and/or parts thereof may automatically play the highlight video, while other user interfaces and/or parts thereof may automatically play the video in its original form. For example, a preview screen that includes a plurality of videos and/or photos may be configured to automatically display a preview of the video by playing the highlight video. When the video is selected from the preview screen, the video in its original form may be automatically played.

In some implementations, a duration of the highlight video may be a configurable parameter of the highlight video. For example, a maximum duration of the highlight video may be specified in units of time (e.g., maximum of 15 seconds per highlight video), or in a fraction/percentage of the original video (e.g., 50% of the length of the original video). Accordingly, the highlight video may be generated by selecting video clips according to the ranking (e.g., starting with the highest-ranked video clip) and without exceeding the maximum duration. Thus, the highlight video may be used to identify the highest quality parts of the original video while also satisfying the maximum duration limit.

In some implementations, the scores discussed above (e.g., frame/clip quality and/or diversity scores) may be used while a video is being captured to control a frame rate of the video. For example, when the scores are relatively low (e.g., below a threshold score), the frame rate of the video may be reduced and/or recording may be paused, and when the scores are relatively high, recording may be resumed and/or the frame rate of the video may be increased.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112, one or more of which may be configured to generate dual-pixel image data.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
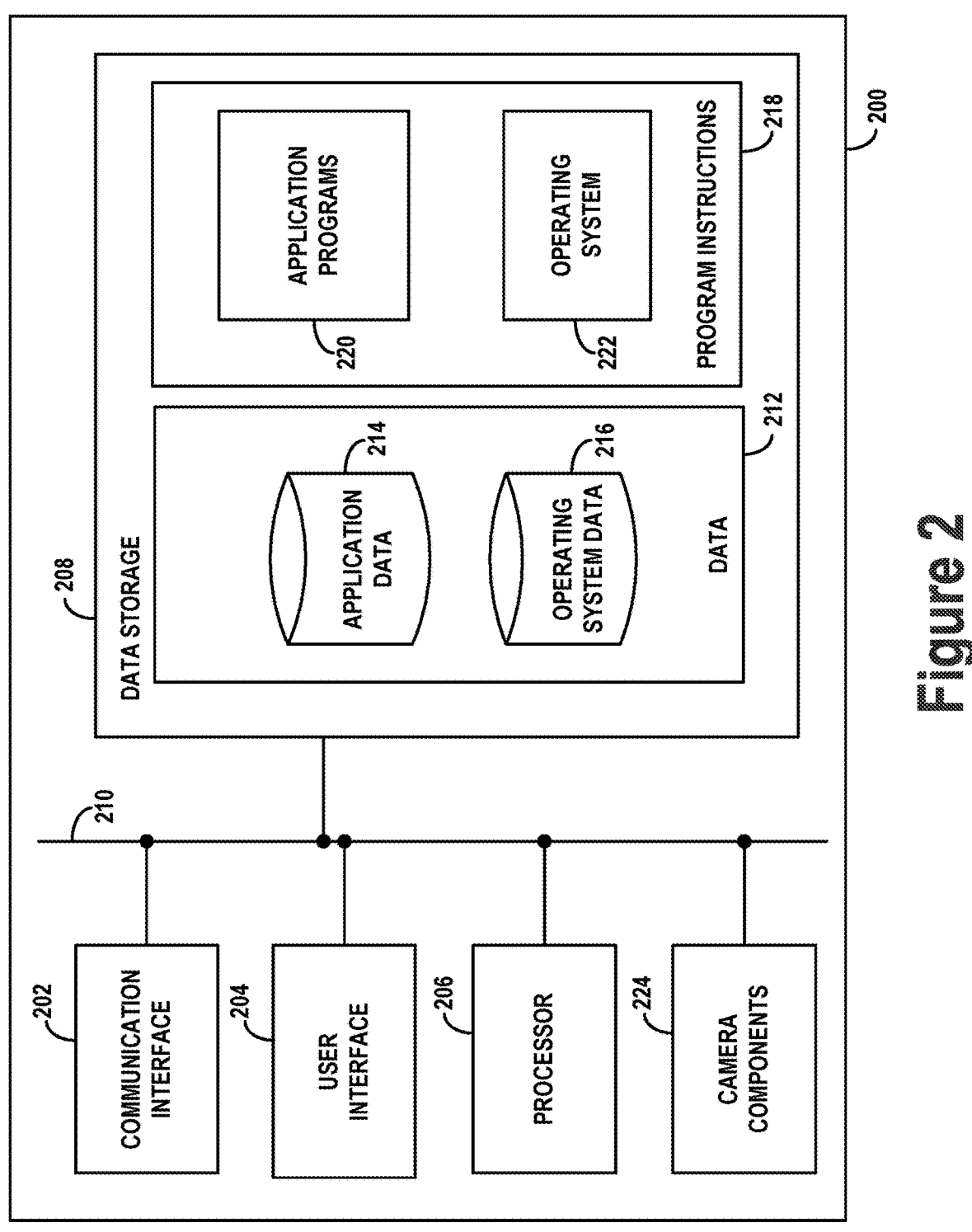
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Highlight Video System

Figure 3:
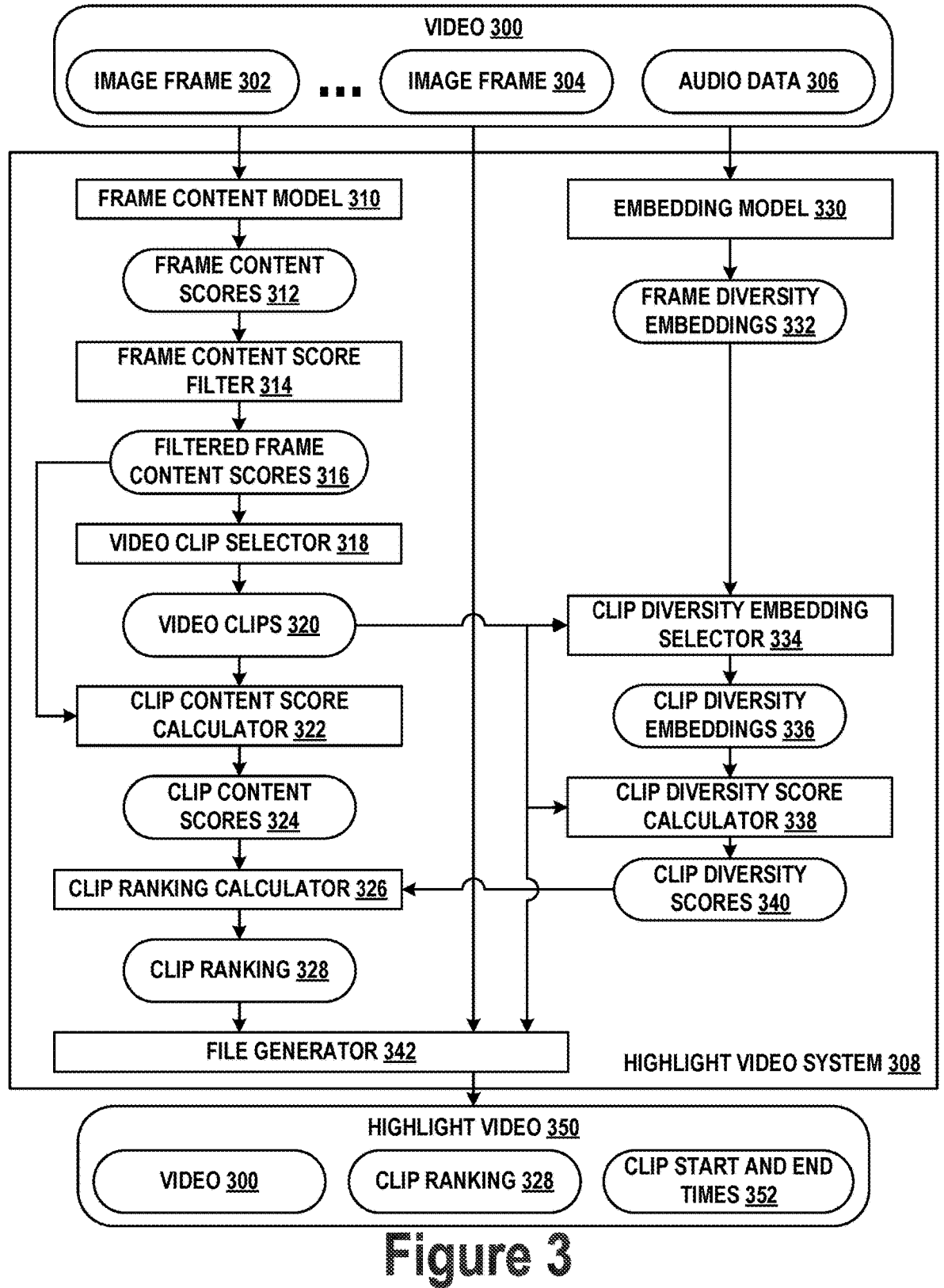
FIG. 3 illustrates a highlight video system, in accordance with examples described herein.

FIG. 3 represents an example system for generating a highlight video that includes a plurality of ranked video clips, which represent a subset of a longer video. Specifically, highlight video system 308 may be configured to generate highlight video 350 based on video 300. Highlight video 350 may alternatively be referred to as a top shot video, a summary video, and/or a feature video, among other possibilities. Highlight video system 308 may include frame content model 310, frame content score filter 314, video clip selector 318, clip content score calculator 322, clip ranking calculator 326, embedding model 330, clip diversity embedding selector 334, clip diversity score calculator 338, and file generator 342.

Video 300 may include a plurality of image frames, as represented by image frame 302 through image frame 304 (i.e., images frames 302-304). Video 300 may also include audio data 306 associated with image frames 302-304. Video 300 may be generated by, for example, computing device 100 and/or computing system 200, among other possibilities, and may represent various possible environments and/or scenes.

The quality of video 300 may vary over time, with some video clips in video 300 being of higher quality than other video clips in video 300. The quality of a video clip may be quantified using a total clip quality score, which may be based on (i) a clip content score that represents the presence of particular visual and/or aural features in the video clip and/or (ii) a clip diversity score that represents the extent to which the video clip differs visually and/or aurally from other video clips in video 300. Highlight video system 308 may be configured to determine the total clip quality scores of different parts of video 300, and select therefrom a plurality of video clips that are of higher quality than other parts of video 300, thus providing a summary of the relatively more important parts of video 300.

Frame content model 310 may be configured to generate frame content scores 312 based on video 300. For example, frame content model 310 may be configured to generate, for each respective image frame of image frames 302-304, a corresponding frame content score. Thus, the number of frame content scores 312 may be equal to the number of image frames 302-304. Alternatively, frame content model 310 may be configured to generate a corresponding frame content score for a subset of image frames 302-306 (e.g., for every other image frame). The corresponding frame content score of a respective image frame may be based on the visual features present in the respective image frame and/or the aural features present in a corresponding portion of audio data 306 (e.g., the portion of the audio waveform associated with the same time stamp as the respective image frame).

For example, video 300 may be expressed as V= $\{(v_1, a_1), \ldots, (v_n, a_n)\}$, where $v_i$ i∈$\{1, \ldots, n\}$ represents the ith image frame of image frames 302-304 and $a_i$ represents the audio data associated with the ith image frame. Frame content scores 312 may be expressed as Q= $\{q_1, \ldots, q_n\}$, where $q_i$ represents the frame content score of the ith image frame of image frames 302-304. The frame content score $q_i$ may be expressed as $$q_i = w_1^v f_1^v(v_i) + \ldots + w_k^v f_k^v(v_i) + w_1^a f_1^a(a_i) + \ldots + w_m^a f_m^a(a_i),$$

where $$w_j^v$$

represents a weight of a visual feature identified by function

10

$$f_j^v$$

$(v_i)$, j∈k in image frame $v_i$ and $$w_j^a$$

represents a weight of an aural feature identified by function $$f_l^a$$

$(a_i)$, l∈m in audio data $a_i$. Thus, for example, each respective content score of frame content scores 312 may be based on a weighted sum of k visual features and m aural features present in a corresponding portion of video 300 and detected by corresponding functions.

In some implementations, some of the functions $$f_j^v$$

and/or $$f_l^a$$

may determine $q_i$ based additionally on the visual and/or aural content of one or more neighboring frames of the ith image frame. Specifically, some of the functions $$f_j^v$$

and/or $$f_l^a$$

may determine $q_i$ based additionally on one or more preceding image frames (and associated audio data) and/or one or more successive image frames (and associated audio data). For example, for some values of j, $$f_j^v(v_{i-1}, v_i, v_{i+1})$$

and/or, for some values of l, $$f_l^a(a_{i-1}, a_i, a_{i+1}).$$

The visual features detected by functions $$f_1^v$$

through $$f_k^v$$

may include a number of instances of a particular object (e.g., human, human face, animal, vehicle, etc.) present in a given image frame; respective sizes, visual qualities, positions, and/or orientations of any instances of the particular object present in the given image frame; an extent of motion saliency of objects present in the given image frame; an extent of blurring due to motion and/or defocus of the given image frame; and/or an extent of variation of an auto exposure, auto focus, auto white balance, and/or lens stability of the camera while capturing the given image frame, among other visual features. Some of the visual features may be represented by the pixel values of the given image frame, while other visual features may be represented by metadata associated with the given image frame. The aural features detected by functions $$f_1^a$$

through $$f_m^a$$

may include an amplitude of a given audio segment, frequencies present in the given audio segment, the presence of a human voice in the given audio segment, and/or the presence of one or more other sounds (e.g., clapping) in the given audio segment, among other possibilities.
Functions $$f_1^v - f_k^v$$

and $$f_1^a - f_m^a$$

may be implemented using rule-based algorithms and/or machine learning models. Functions $$f_1^v - f_k^v$$

and $$f_1^a - f_m^a$$

may be modified by adding functions and/or removing functions to reward and/or penalize the presence and/or absence of particular visual and/or aural features. In some cases, a user may be able to define, select, and/or otherwise specify the functions to be used in calculating frame content scores 312, such that any resulting highlight videos are based on the user's preferences. In some implementations, weights $$w_1^v - w_k^v$$

and $$w_1^a - w_m^a$$

may be learned as part of a training process based on training data representing the relative importance of different visual and/or aural features to one or more users.

Frame content score filter 314 may be configured to generate filtered frame content scores 316 based on (raw) frame content scores 312. Specifically, frame content score filter 314 may be configured to apply a low-pass filter to frame content scores 312, such that high-frequency variations in frame content scores 312 are smoothed out. For example, frame content score filter 314 may include a Gaussian moving average and/or a median filter, among other possibilities. An example of (raw) frame content scores 312 is shown in graph 400 of FIG. 4, and an example of filtered frame content scores 316 is shown in graph 402 of FIG. 4.

Video clip selector 318 may be configured to select, from video 300, video clips 320 based on filtered frame content scores 316. For example, video clip selector 318 may identify sequences of two or more consecutive image frames, where each of the two or more consecutive frames is associated with a corresponding frame content score that exceeds a threshold content score. Thus, a start time of a respective video clip may be indicated by the filtered frame content scores 316 crossing above the threshold content score, and an end time of a respective video clip may be indicated by the filtered frame content scores 316 crossing below the threshold content score.

The threshold content score may be predetermined, modifiable by a user, and/or dynamically selected for each video. In one example, a fixed threshold content score may be used for all videos. In another example, the threshold content score may be modifiable by way of a user interface to allow the user to specify the threshold content score according to the user's preferences (e.g., to achieve a desired highlight video duration). In a further example, the threshold content score may be selected based on, for example, a mean, median, or other function of filtered frame content scores 316 and/or frame content scores 312. Thus, in cases where the threshold content score is based on the mean of filtered frame content scores 316, clip content score calculator 322 may be configured to select above average video clips 320 from video 300.

Video clips 320 may include nonempty subsets of video 300 that include better and/or more important content than other parts of video 300, as determined based on filtered frame content scores 316. Each respective video clip of video clips 320 may be represented by, for example, a start time and an end time of the respective video clip within video 300. In some implementations, video clip selector 318 may be configured to select video clips that have at least a threshold duration (e.g., 3 seconds, 5, seconds, etc.), thus avoiding including video clips that are too short to be meaningful to a viewer. The threshold duration may be a user-modifiable parameter of highlight video system 308. In further implementations, video clip selector 318 may be configured to adjust the start and/or end time determined based on filtered frame content scores 316 such that continuous action is not interrupted by the start and/or end of a respective video clip.

Clip content score calculator 322 may be configured to determine clip content scores 324 for video clips 320 based on filtered frame content scores 316. Specifically, clip content scores 324 may include, for each respective video clip of video clips 320, a corresponding clip content score. Clip content score calculator 322 may be configured to calculate the clip content score of a respective video clip based on the filtered frame content scores of, for example, some or all of the image frames that form the respective video clip. For example, the clip content score of the respective video clip may be based on a sum, average, median, minimum, maximum, and/or other function of the filtered frame content scores of the image frames that form the respective video clip. Thus, the clip content score of video clip $C_{ab} = \{(v_a, a_a), \ldots, (v_b, a_b)\}$ may be expressed as $$Q_{ab} = g(q_a^*, \ldots, q_b^*),$$

where $$q_i^*$$

denotes the filtered version of $q_i$, and where g( ) represents the sum, average, median, minimum, maximum, and/or other function.

In addition to scoring video clips 320 based on the visual and/or aural content thereof, highlight video system 308 may be configured to score each respective video clip of video clips 320 based on the visual and/or aural diversity of the respective video clip relative to other video clips of video clips 320. Accordingly, embedding model 330 may be configured to generate frame diversity embeddings 332 based on video 300. Specifically, embedding model 330 may be configured to generate, for each respective image frame of a plurality of image frames 302-304, a corresponding frame diversity embedding based on the respective image frame and/or the audio data associated therewith. Thus, in some cases, the number of frame diversity embeddings 332 may include up to the number of image frames 302-304.

Frame diversity embeddings 332 may include vectors that provide respective latent space representations of image frames 302-304 and/or subsets thereof. Alternatively or additionally, frame diversity embeddings 332 may include matrices and/or tensors that provide respective feature maps of image frames 302-304 and/or the subsets thereof. The frame diversity embedding di of image frame v; may be expressed as $d_i = h(v_i, a_i)$, where h( ) represents a function implemented by embedding model 330. Embedding model 330 may represent a machine learning model that has been trained to generate image and/or audio embeddings. For example, embedding model 330 may represent an encoder model that has been trained (e.g., as part of an autoencoding task) using a plurality of training image data.

In some cases, embedding model 330 may be configured to generate frame diversity embeddings for each of image frames 302-304. In other cases, embedding model 330 may be configured to generate frame diversity embeddings for image frames that are planned to be used for generating clip diversity embeddings 336, but might not be configured to generate frame diversity embeddings that are not planned to be used for generating clip diversity embeddings 336. Accordingly, in some implementations, embedding model 330 may be configured to receive a representation of video clips 320 as input, thereby allowing embedding model 330 to generate frame diversity embedding 332 for one or more image frames of video clips 320 and avoid generating frame diversity embeddings for other parts of video 300.

The corresponding frame diversity embedding of a respective image frame may be based on and representative of the visual features present in the respective image frame and/or the aural features present in a corresponding portion of audio data 306. Unlike frame content scores 312, which may reward and/or penalize the presence or absence of particular visual and/or aural features in image frames 302-304, frame diversity embeddings 332 may represent the visual and/or aural content of image frames 302-304 without rewarding or penalizing any particular feature. Thus, frame diversity embeddings 332 may provide compressed representations of image frames 302-304 and/or corresponding audio data, whereas frame content scores 312 may provide a grade and/or assessment of the contents of image frames 302-304 and/or corresponding audio data.

Clip diversity embedding selector 334 may be configured to select clip diversity embeddings 336 for video clips 320 from frame diversity embeddings 332. Specifically, clip diversity embeddings 336 may include, for each respective video clip of video clips 320, at least one corresponding clip diversity embedding. Clip diversity embedding selector 334 may be configured to select the clip diversity embedding(s) of a respective video clip from the frame diversity embeddings of image frames that form the respective video clip Thus, the clip diversity embedding of video clip $C_{ab} = \{(v_a, a_a), \ldots, (v_b, a_b)\}$ may be expressed as $D_{ab} \subseteq \{d_a \ldots, d_b\}$, where $\subseteq$ denotes an inclusive subset. In some implementations, the operations of embedding model 330 and clip diversity embedding selector 334 may be combined, such that frame diversity embeddings 332 and clip diversity embeddings 336 include the same embeddings (i.e., unused frame diversity embeddings are not generated).

In one example, the clip diversity embedding of the respective video clip may be the frame diversity embedding associated with a center image frame of the respective video clip (i.e., the clip diversity embedding may include one frame diversity embedding, where $$D_{ab} = \left\{ d_{\frac{a+b}{2}} \right\}.$$

In another example, the clip diversity embeddings of the respective video clip may include the frame diversity embedding associated with every yth (e.g., every other) image frame of the respective video clip (i.e., the clip diversity embeddings of a clip with z image frames may include z/y frame diversity embeddings, where $D_{ab} = \{d_a, d_{a+y}, d_{a+2y}, \ldots d_{p-y}, d_b\}$). In another example, the clip diversity embeddings of the respective video clip may include the frame diversity embedding associated with all image frames of the respective video clip (i.e., the clip diversity embeddings of a clip with z image frames may include z frame diversity embeddings, where $D_{ab}=\{d_a, \ldots, d_b\}$).

Clip diversity score calculator 338 may be configured to determine clip diversity scores 340 for video clips 320 based on clip diversity embeddings 336. Specifically, clip diversity scores 340 may include, for each respective video clip of video clips 320, a corresponding clip diversity score. Clip diversity score calculator 338 may be configured to calculate the clip diversity score of a respective video clip by comparing (i) the clip diversity embedding(s) of the respective video clip to (ii) the respective clip diversity embedding(s) of every other video clip of video clips 320. Performing the comparison may involve determining a distance metric (e.g., cosine distance, L1-norm distance, L2-norm distance, etc.) or other metric (e.g., dot product) between the clip diversity embeddings being compared. A distance between embeddings may be proportional to a difference between (i.e., a diversity of) the video clips being compared.

Clip diversity score calculator 338 may generate, for each respective video clip of video clips 320, a plurality of candidate clip diversity scores. The clip diversity score of the respective video clip may be determined based on, for example, a minimum of the plurality of candidate clip diversity scores for the respective video clip. Alternatively, the clip diversity score of the respective video clip may be determined by determining an average (or other function) of the plurality of candidate clip diversity scores for the respective video clip.

Thus, the clip diversity score of video clip $C_{ab}$ associated with clip diversity embedding(s) $D_{ab}$ may be expressed as $S_{ab}=\delta(s(D_{ab}, D_c))$ $c \in Z$, $0 \le c \le F$, where $\delta()$ represents a minimum, average, or other function, $s()$ represents a distance metric configured to generate the plurality of candidate clip diversity scores, F represents the number of video clips 320, and c is iterated through video clips 320. When at least one of $D_{ab}$ and/or $D_c$ includes two or more clip diversity embeddings (e.g., $D_{ab}=\{d_a, \ldots, d_b\}$ and $D_c=\{d_u, \ldots, d_v\}$), distance function $s()$ may be configured to compare every combination of the clip diversity embeddings thereof. That is, $s(D_{ab}, D_c)=\{s(d_\alpha, d_\beta)\}$, $\alpha, \beta \in Z$, $a \le \alpha \le b$, $u \le \beta \le v$. Thus, in some cases, the plurality of candidate clip diversity scores of the respective video clip may be based on a comparison of (i) each respective frame diversity embedding of the respective video clip to (ii) all other frame diversity embeddings of all other video clips of video clips 320.

In some cases, it may be desirable to reduce and/or minimize an amount of time that highlight video system 308 takes to generate highlight video 350. For example, it may be desirable to execute the operations of highlight video system 308 in under a threshold amount of time (e.g., one second), such that highlight video 350 appears to be generated in real time and/or concurrently with video 300. When highlight video system 308 is provided on the same device as the camera capturing video 300, such simulation of real time and/or concurrent operation may allow highlight video file 350 to appear to be displayed immediately, without user-perceptible delay, after capture of video 300 is completed.

In such cases, generation of frame content scores 312 may be performed in parallel and/or concurrently with obtaining video 300. For example, frame content model 310 may be configured to generate a corresponding frame content score for image frame 302 before and/or while an image frame that immediately follows image frame 302 is being captured. Similarly, image frame 304 may be captured after and/or during generation of a frame content score for an image frame that immediately precedes image frame 304. Additionally or alternatively, a number of and/or complexity of the functions utilized by frame content model 310 may be selected to achieve a target execution time of these functions.

Additionally and/or alternatively, a number of clip diversity embeddings used per video clip may include up to a predetermined number of clip diversity embeddings, where the predetermined number is smaller than the number of frame diversity embeddings associated with the image frames of that video clip. For example, each of video clips 320 may be associated with one clip diversity embedding (e.g., the frame diversity embedding of the center image frame thereof), thereby reducing and/or minimizing the amount of clip diversity embedding comparisons carried out in order to calculate clip diversity scores 340. In implementations where longer processing times and/or computational power are provided, the predetermined number of clip diversity embeddings per video clip may be larger. For example, clip diversity embedding selector 334 may be configured to select, as the clip diversity embeddings of each respective video of video clips 320, all of the frame diversity embeddings of the image frames that form the respective video.

Clip ranking calculator 326 may be configured to determine clip ranking 328 based on clip content scores 324 and/or clip diversity scores 340. Clip ranking 328 may represent a ranking of video clips 320 from, for example, a highest quality clip to a lowest quality clip. In some cases, clip ranking 328 may be used, as part of highlight video 350, to play video clips 320 in an order corresponding to clip ranking 328 and independently of a chronological order of video clips 320. In other cases, video clips 320 may instead be played in the chronological order of video clips 320 and independently of clip ranking 328.

In one example, clip ranking calculator 326 may be configured to determine clip ranking 328 based on a total clip quality score for a respective clip, where the total clip quality score is a weighted sum of the corresponding clip content score and the corresponding clip diversity score. Thus, the total clip quality score of video clip $C_{ab}$ may be expressed as $T_{ab}=W_Q Q_{ab}+W_D S_{ab}$, where $W_Q$ is the weight of the clip content score and $W_D$ is the weight of the clip diversity score. The total clip quality score for a respective video clip may alternatively be referred to as an overall clip quality score since it is based on both the clip content score and the clip diversity score of the respective video clip.

By considering the stand-alone content of each video clip, as represented by clip content scores 324, highlight video system 308 may be configured to identify video clips that include notable and/or important parts of video 300. By also considering the diversity of each video clip relative to other video clips, as represented by clip diversity scores 340, highlight video system 308 may be configured to identify video clips that also include visual and/or aural variability. Thus, a video clip with a high total clip quality score may be considered to be highly representative of video 300, since it includes parts of video 300 that are visually and/or aurally important and varied.

File generator 342 may be configured to generate highlight video 350 based on video 300, video clips 320, and clip ranking 328. In one example, highlight video 350 may include video 300, clip ranking 328, and clip start and end times 352, which may be determined based on the representation of video clips 320. Clip start and end times 352 may include, for each respective video clip of video clips 320, a corresponding start time of the respective video clip and a corresponding end time of the respective video clip. Thus, highlight video 350 may allow for playback of video 300 in its original form (i.e., chronologically and in its entirety), and/or playback of video clips 320 from video 300. Highlight video 350 may allow video clips 320 to be played back (e.g., watched) chronologically (i.e., sequentially and in the order in which video clips 320 appear in video 300), or according to clip ranking 328 (i.e., starting with the highest-ranked video clip, and independently of the chronological order of video clips 320 in video 300). Clip ranking 328 and clip start and end times 352 may be represented as part of metadata of a file format of highlight video 350 (e.g., .MP4).

In another example, highlight video 350 could include video clips 320 instead of the entirety of video 300. That is, highlight video 350 may be generated by storing video clips 320 and clip ranking 328, and discarding low-quality portions of video 300. In some implementations, clip ranking 328 may be omitted from highlight video 350, and highlight video 350 may instead be generated by arranging and/or stitching together video clips 320 in chronological order or according to clip ranking 328. In such implementations, highlight video 350 might not provide for the playback order of video clips 320 to be varied, clip start and end times 352 may be omitted from highlight video 350, and/or clip ranking 328 may be represented implicitly when video clips 320 are arranged and/or stitched together according to clip ranking 328.

When highlight video 350 is structured as shown in FIG. 3, highlight video 350 may allow for playback of video 300 in its original form (e.g., chronologically, with all parts of video 300 included) and/or playback of video clips 320 (e.g., chronologically, or according to clip ranking 328). For example, a user interface may be configured to allow a user to select from and/or toggle between (i) playback of video 300 in its original form (ii) and/or playback of video clips 320.

Additionally or alternatively, some user interfaces and/or portions thereof may be configured (e.g., by default) to play video 300 in its original form, while other user interfaces and/or portions thereof may instead be configured to play video clips 320. For example, a grid view configured to preview photos and/or videos of a photo/video library may be configured to play a preview/summary of video 300 by playing video clips 320 (e.g., chronologically, or according to clip ranking 328). Once video 300 is selected from the grid view, video 300 may be played back in its entirety. In some implementations, the playback mode of the grid view and/or of the video playback interface may be a user-modifiable parameter, as mentioned above.

In some implementations, highlight video system 308 may be configured to allow for selection of a duration limit for video clips 320. The duration limit may be expressed as a time limit (e.g., 15 seconds), and/or as a fraction of the length of video 300 (e.g, 50% of video 300) In one example, highlight video system 308 may be configured to enforce the duration limit by selecting, from video clips 320, the highest-ranked video clips until the duration limit is reached (e.g., until a duration of the selected highest-ranked video clips falls within a threshold time of, without exceeding, the duration limit), and discarding any other video clips. In another example, the frame content threshold may be iteratively adjusted until a duration of video clips 320 reaches the duration limit. For example, the frame content threshold may be increased to shorten the duration of resulting video clips 320, or decreased to lengthen the duration of resulting video clips 320.

In some cases, highlight video system 308 may be used to control a frame rate of video 300 as it is being captured. For example, when the corresponding total clip quality scores of captured video clips fall below a total clip quality threshold, some of the captured image frames may be discarded, rather than being saved as part of video 300. For example, a frame rate of video 300 may be reduced and/or recording may be paused. When the corresponding total clip quality scores of additional video clips rise above the total clip quality threshold, the frame rate of video 300 may be increased and/or recording may be resumed. Thus, for example, a resulting time lapse video may represent high-quality scenes at a high frame rate and relatively lower quality scenes at a lower frame rate. In some implementations, such frame rate control may alternatively be based on filtered frame content scores 316, clip content scores 324, clip diversity scores 340, and/or one or more combinations thereof.

IV. Example Video Scores

Figure 4:
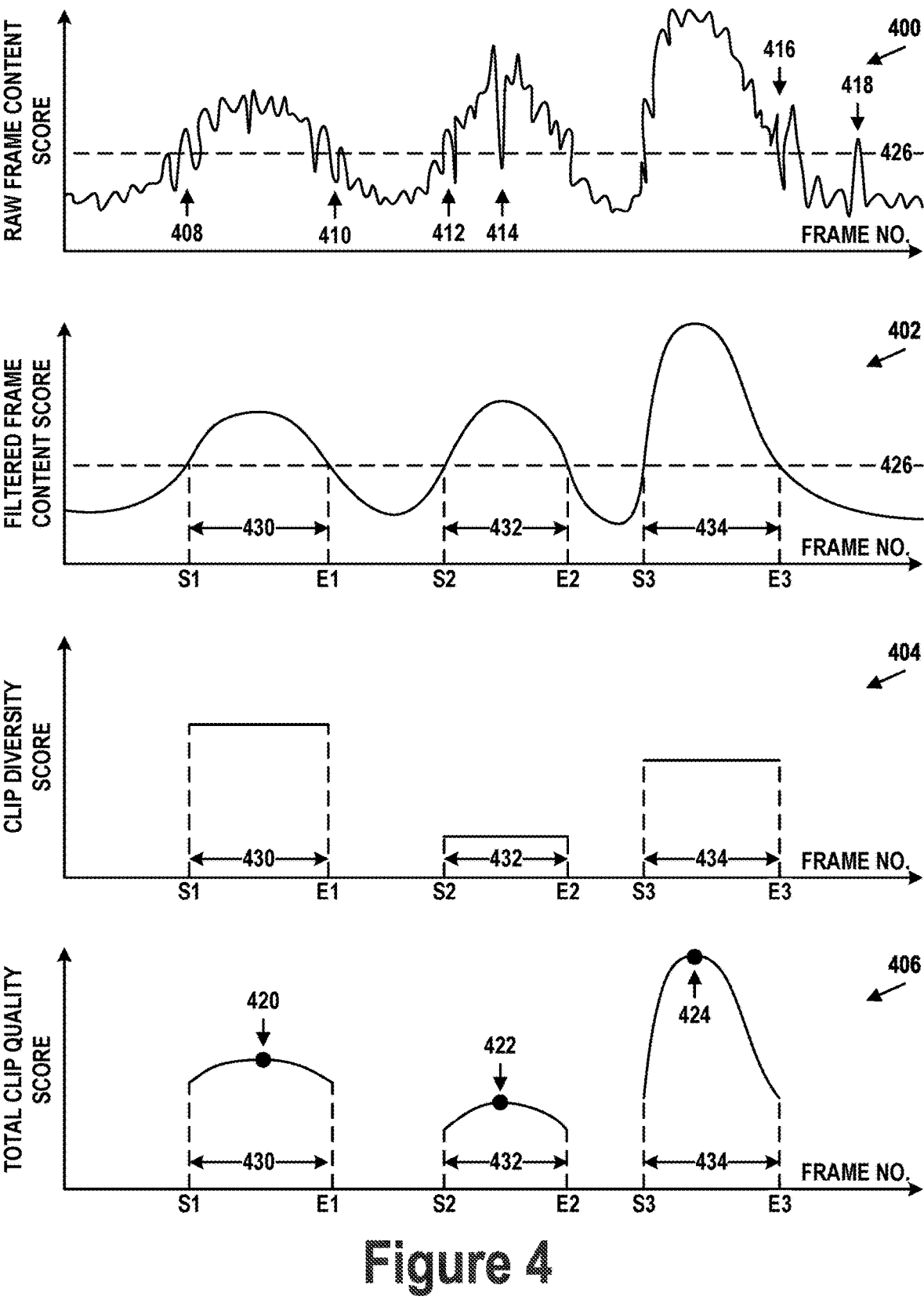
FIG. 4 illustrates graphs of image frame and video clip scores, in accordance with examples described herein.

FIG. 4 includes graphical representations of frame content scores 312, filtered frame content scores 316, clip diversity scores 340, and total clip quality scores determined for an example video (e.g., video 300). Specifically, graph 400 represents raw frame content scores (e.g., frame content scores 312) as a function of frame number within the video, graph 402 represents filtered frame content scores (e.g., filtered frame content scores 316) as a function of frame number within the video, graph 404 represents clip diversity scores (e.g., clip diversity scores 340) as a function of frame number within the video, and graph 406 represents total clip quality scores as a function of frame number within the video.

Graphs 400 and 402 show threshold content score 426 using a dashed line. Threshold content score 426 may be used to divide the image frames of the video into low-quality-content image frames associated with scores below threshold content score 426 and high-quality-content image frames associated with scores above threshold content score 426.

When the frame content scores are unfiltered, as shown in graph 400, threshold content score 426 may be crossed multiple times in a relatively short amount of time. If the highlight video were to be generated based on the raw frame content scores, it might include many short video clips and/or interruptions to longer video clips, which would be unlikely to provide a desirable/enjoyable video viewing experience. For example, arrows 408, 410, 412, and 416 illustrate sections of the video where raw frame content score repeatedly crosses threshold content score 426, and arrows 414 and 418 illustrate sections of the video where a longer section of the video is interrupted by the raw frame content score briefly crossing threshold content score 426.

Unlike graph 400, graph 402 does not include spurious crossings of threshold content score 426 due to the frame content scores having been low-pass filtered. Graph 402 represents video clips 430, 432, and 434 identified within the video based on the filtered frame content scores. Specifically, start time S1 of video clip 430 is determined based on filtered frame content score crossing above threshold content score 426 and an end time E1 of video clip 430 is determined based on filtered frame content score crossing below threshold content score 426. A start time S2 of video clip 432 is determined based on filtered frame content score crossing above threshold content score 426 and an end time E2 of video clip 432 is determined based on filtered frame content score crossing below threshold content score 426. A start time S3 of video clip 434 is determined based on filtered frame content score crossing above threshold content score 426 and an end time E3 of video clip 434 is determined based on filtered frame content score crossing below threshold content score 426.

The clip content score of video clip 430 (e.g., average of the filtered frame content scores from S1 to E1) is similar (e.g., within a threshold of) the clip content score of video clip 432 (e.g., average of the filtered frame content scores from S2 to E2). The clip content score of video clip 434 (e.g., average of the filtered frame content scores from S3 to E3) exceeds the clip content scores of video clips 430 and 432. Thus, the clip content scores, taken alone, indicate that video clip 434 is of higher quality than video clips 430 and 432, which are of approximately the same quality.

Graph 404 illustrates the clip diversity scores of video clips 430, 432, and 434. Specifically, as shown by graph 404, the clip diversity score of video clip 430 exceeds the clip diversity score of video clip 434, and the clip diversity score of video clip 434 exceeds the clip diversity score of video clip 432. Thus, the clip diversity scores, taken alone, indicate that video clip 430 is of higher quality than video clip 434, which is of higher quality than video clip 432.

Graph 406 illustrates the total clip quality score of video clips 430, 432, and 434. Specifically, as shown by graph 406, total clip quality score 424 of video clip 434 exceeds total clip quality score 420 of video clip 430, and total clip quality score 420 of video clip 430 exceeds total clip quality score 422 of video clip 432. Thus, the total clip quality scores, which consider both the clip content score and the clip diversity score, indicate that video clip 434 is of higher overall quality than video clip 430, which is of higher overall quality than video clip 342.

V. Additional Example Operations

FIG. 5 illustrates a flow chart of operations related to generating a highlight video. The operations may be carried out by computing device 100, computing system 200, and/or highlight video system 308, among other possibilities. The embodiments of FIG. 5 may be simplified by the removal of any one or more of the features shown therein. Further, these embodiments may be combined with features, aspects, and/or implementations of any of the previous figures or otherwise described herein.

Block 500 may involve obtaining a video that includes a plurality of image frames.

Block 502 may involve determining, for each respective image frame of the plurality of image frames, a corresponding frame content score based on a visual content of the respective image frame.

Block 504 may involve selecting, from the plurality of image frames, a plurality of video clips. Each respective video clip of the plurality of video clips may (i) include a plurality of consecutive image frames and (ii) may be selected based on the corresponding frame content scores of the plurality of consecutive image frames of the respective video clip.

Block 506 may involve determining, for each respective video clip of the plurality of video clips, a corresponding clip content score based on the corresponding frame content scores of the plurality of consecutive image frames of the respective video clip.

Block 508 may involve generating a highlight video that includes (i) the plurality of video clips and (ii) a representation of a ranking of the plurality of video clips. The ranking may be based on the corresponding clip content score of each respective video clip of the plurality of video clips.

In some embodiments, the highlight video may be displayed by playing the plurality of video clips in an order corresponding to the ranking and independently of a chronological order of the plurality of video clips within the video.

In some embodiments, the highlight video may be displayed by playing the plurality of video clips in a chronological order of the plurality of video clips within the video.

In some embodiments, the highlight video may include the video and metadata that includes (i) the representation of the ranking and (ii), for each respective video clip of the plurality of video clips, a representation of a start time corresponding to a first frame of the respective video clip and an end time corresponding to a last frame of the respective video clip.

In some embodiments, a corresponding clip diversity embedding may be determined for each respective video clip of the plurality of video clips. The corresponding clip diversity embedding may represent a visual content of the respective video clip, and may be determined by processing at least one of the plurality of consecutive image frames of the respective video clip by an encoder model. A corresponding clip diversity score may be determined for each respective video clip of the plurality of video clips. The corresponding clip diversity score may represent a difference of the visual content of the respective video clip relative to other video clips of the plurality of video clips. The corresponding clip diversity score may be determined by comparing the corresponding clip diversity embedding of the respective video clip to the corresponding clip diversity embeddings of the other video clips. The ranking may be further based on the corresponding clip diversity score of each respective video clip.

In some embodiments, determining the corresponding clip diversity score may include determining, for each respective video clip of the plurality of video clips, a plurality of candidate clip diversity scores. Each respective candidate clip diversity score of the plurality of candidate clip diversity scores may be based on a distance between (i) the corresponding clip diversity embedding of the respective video clip and (ii) the corresponding clip diversity embedding of a corresponding video clip of the other video clips. Determining the corresponding clip diversity score may also include selecting a minimum candidate clip diversity score from the plurality of candidate clip diversity scores.

In some embodiments, determining the corresponding clip diversity embedding may include generating, by the encoder model, a frame diversity embedding of a center image frame of the respective video clip. The corresponding clip diversity embedding of the respective video clip may be equal to the frame diversity embedding of the center image frame.

In some embodiments, determining the corresponding clip diversity embedding may include generating, by the encoder model and for each respective image frame of the plurality of consecutive image frames of the respective video clip, a frame diversity embedding of the respective image frame. The corresponding clip diversity embedding of the respective video clip may include the frame diversity embedding of each respective image frame of the plurality of consecutive image frames of the respective video clip. Determining the corresponding clip diversity score may include generating, for each respective image frame of the plurality of consecutive image frames of the respective video clip, a plurality of candidate frame diversity scores of the respective image frame by comparing the frame diversity embedding of the respective image frame to corresponding frame diversity embeddings of the plurality of consecutive image frames of the other video clips. Determining the corresponding clip diversity score may also include selecting the corresponding clip diversity score for the respective video clip from the plurality of candidate frame diversity scores of each respective image frame of the plurality of consecutive image frames of the respective video clip.

In some embodiments, a corresponding total clip quality score may be determined for each respective video clip of the plurality of video clips based on the corresponding clip content score and the corresponding clip diversity score. The ranking may be determined based on the corresponding total clip quality score of each respective video clip of the plurality of video clips.

In some embodiments, determining the corresponding frame content score may include determining, for each respective image frame of the plurality of image frames, the corresponding frame content score based on aural features of an audio content associated with the respective image frame.

In some embodiments, determining the corresponding clip content score may include determining one or more of: (i) a sum, (ii) an average, (iii) a median, or a (iv) a maximum, of the corresponding frame content scores of the plurality of consecutive image frames of the respective video clip.

In some embodiments, determining the corresponding frame content score may include determining, for each respective image frame of the plurality of image frames, a corresponding raw frame content score based on the visual content of the respective image frame, and determining, for each respective image frame of the plurality of image frames, the corresponding frame content score by applying a low-pass filter to the corresponding raw frame content scores of the plurality of image frames.

In some embodiments, the corresponding frame content score may be determined concurrently with obtaining the video. The highlight video may be generated within a threshold time period following completion of obtaining the video to simulate real-time operation.

In some embodiments, selecting the plurality of video clips may include selecting the plurality of video clips based on the plurality of consecutive image frames of each respective video clip of the plurality of video clips being associated with corresponding frame content scores that exceed a threshold content score.

In some embodiments, the threshold content score may be determined based on one or more of: (i) an average or (ii) a median, of the corresponding frame content scores of the plurality of consecutive image frames of each respective video clip of the plurality of video clips.

In some embodiments, selecting the plurality of video clips may include selecting each respective video clip of the plurality of video clips based on the respective video clip having at least a threshold duration.

In some embodiments, a user interface may be provided. The user interface may be configured to provide a selection of a video playback mode. The video playback mode may be selected from (i) a first video playback mode in which the video is played chronologically and independently of the ranking and (ii) a second video playback mode in which the plurality of video clips are played based on the ranking. The selection of the video playback mode may be received by way of the user interface. One or more of the plurality of image frames of the video may be displayed according to the selection of the video playback mode.

In some embodiments, a duration limit for the plurality of video clips may be received. One or more video clips may be selected from the plurality of video clips based on (i) the ranking and (ii) the duration limit. An output may be generated based on the one or more video clips.

In some embodiments, obtaining the video may include obtaining, from an image sensor, a first image frame of the plurality of image frames. Determining the corresponding frame content score may include determining a first frame content score based on a visual content of the first image frame before obtaining, from the image sensor, subsequent image frames of the plurality of image frames A frame rate at which the subsequent image frames are obtained from the image sensor may be adjusted based on the first frame content score.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining a video comprising a plurality of image frames;

determining, for each respective image frame of the plurality of image frames, a corresponding frame content score based on a visual content of the respective image frame;

selecting, from the plurality of image frames, a plurality of video clips, wherein each respective video clip of the plurality of video clips (i) comprises a plurality of consecutive image frames and (ii) is selected based on the corresponding frame content scores of the plurality of consecutive image frames of the respective video clip;

determining, for each respective video clip of the plurality of video clips, a corresponding clip content score based on the corresponding frame content scores of the plurality of consecutive image frames of the respective video clip;

determining, for each respective video clip of the plurality of video clips, a corresponding clip diversity embedding that provides a latent space representation of a visual content of the respective video clip by processing at least one of the plurality of consecutive image frames of the respective video clip by a machine learning model;

determining, for each respective video clip of the plurality of video clips, a corresponding clip diversity score that represents a difference of the visual content of the respective video clip relative to other video clips of the plurality of video clips by comparing the corresponding clip diversity embedding of the respective video clip to the corresponding clip diversity embeddings of the other video clips; and generating a highlight video comprising (i) the plurality of video clips and (ii) a representation of a ranking of the plurality of video clips, wherein the ranking is based on the corresponding clip content score of each respective video clip of the plurality of video clips and the corresponding clip diversity score of each respective video clip.

2. The computer-implemented method of claim 1, further comprising:

displaying the highlight video by playing the plurality of video clips in an order corresponding to the ranking and independently of a chronological order of the plurality of video clips within the video.

3. The computer-implemented method of claim 1, further comprising:

displaying the highlight video by playing the plurality of video clips in a chronological order of the plurality of video clips within the video.

4. The computer-implemented method of claim 1, wherein the highlight video comprises the video and metadata comprising (i) the representation of the ranking and (ii), for each respective video clip of the plurality of video clips, a representation of a start time corresponding to a first frame of the respective video clip and an end time corresponding to a last frame of the respective video clip.

5. The computer-implemented method of claim 1, wherein determining the corresponding clip diversity score comprises:

determining, for each respective video clip of the plurality of video clips, a plurality of candidate clip diversity scores, wherein each respective candidate clip diversity score of the plurality of candidate clip diversity scores is based on a distance between (i) the corresponding clip diversity embedding of the respective video clip and (ii) the corresponding clip diversity embedding of a corresponding video clip of the other video clips; and determining the corresponding clip diversity score based on a function of the plurality of candidate clip diversity scores.

6. The computer-implemented method of claim 5, wherein the function of the plurality of candidate clip diversity scores comprises a minimum of the plurality of candidate clip diversity scores.

7. The computer-implemented method of claim 1, wherein determining the corresponding clip diversity embedding comprises:

generating, by the machine learning model, a frame diversity embedding of a center image frame of the respective video clip, wherein the corresponding clip diversity embedding of the respective video clip is equal to the frame diversity embedding of the center image frame.

8. The computer-implemented method of claim 1, wherein:

determining the corresponding clip diversity embedding comprises:

generating, by the machine learning model and for each respective image frame of the plurality of consecutive image frames of the respective video clip, a frame diversity embedding of the respective image frame, wherein the corresponding clip diversity embedding of the respective video clip comprises the frame diversity embedding of each respective image frame of the plurality of consecutive image frames of the respective video clip; and determining the corresponding clip diversity score comprises:

generating, for each respective image frame of the plurality of consecutive image frames of the respective video clip, a plurality of candidate frame diversity scores of the respective image frame by comparing the frame diversity embedding of the respective image frame to corresponding frame diversity embeddings of the plurality of consecutive image frames of the other video clips; and selecting the corresponding clip diversity score for the respective video clip from the plurality of candidate frame diversity scores of each respective image frame of the plurality of consecutive image frames of the respective video clip.

9. The computer-implemented method of claim 1, further comprising:

determining, for each respective video clip of the plurality of video clips, a corresponding total clip quality score based on the corresponding clip content score and the corresponding clip diversity score; and determining the ranking based on the corresponding total clip quality score of each respective video clip of the plurality of video clips.

10. The computer-implemented method of claim 1, wherein determining the corresponding frame content score comprises:

determining, for each respective image frame of the plurality of image frames, the corresponding frame content score based on aural features of an audio content associated with the respective image frame.

11. The computer-implemented method of claim 1, wherein determining the corresponding clip content score comprises:

determining one or more of: (i) a sum, (ii) an average, (iii) a median, or a (iv) a maximum, of the corresponding frame content scores of the plurality of consecutive image frames of the respective video clip.

12. The computer-implemented method of claim 1, wherein determining the corresponding frame content score comprises:

determining, for each respective image frame of the plurality of image frames, a corresponding raw frame content score based on the visual content of the respective image frame; and determining, for each respective image frame of the plurality of image frames, the corresponding frame content score by applying a low-pass filter to the corresponding raw frame content scores of the plurality of image frames.

13. The computer-implemented method of claim 1, wherein the corresponding frame content score is determined concurrently with obtaining the video, and wherein the highlight video is generated within a threshold time period following completion of obtaining the video to simulate real-time operation.

14. The computer-implemented method of claim 1, wherein selecting the plurality of video clips comprises:

selecting the plurality of video clips based on the plurality of consecutive image frames of each respective video clip of the plurality of video clips being associated with corresponding frame content scores that exceed a threshold content score.

15. The computer-implemented method of claim 14, further comprising:

determining the threshold content score based on one or more of: (i) an average or (ii) a median, of the corresponding frame content scores of the plurality of consecutive image frames of each respective video clip of the plurality of video clips.

16. The computer-implemented method of claim 1, wherein selecting the plurality of video clips comprises:

selecting each respective video clip of the plurality of video clips based on the respective video clip having at least a threshold duration.

17. The computer-implemented method of claim 1, further comprising:

providing a user interface configured to provide a selection of a video playback mode, wherein the video playback mode is selected from (i) a first video playback mode in which the video is played chronologically and independently of the ranking and (ii) a second video playback mode in which the plurality of video clips are played based on the ranking;

receiving, by way of the user interface, the selection of the video playback mode; and displaying one or more of the plurality of image frames of the video according to the selection of the video playback mode.

18. The computer-implemented method of claim 1, wherein obtaining the video comprises obtaining, from an image sensor, a first image frame of the plurality of image frames, wherein determining the corresponding frame content score comprises determining a first frame content score based on a visual content of the first image frame before obtaining, from the image sensor, subsequent image frames of the plurality of image frames, and wherein the method further comprises:

adjusting, based on the first frame content score, a frame rate at which the subsequent image frames are obtained from the image sensor.

19. A system comprising a processor configured to perform operations comprising:

obtaining a video comprising a plurality of image frames;

determining, for each respective image frame of the plurality of image frames, a corresponding frame content score based on a visual content of the respective image frame;

selecting, from the plurality of image frames, a plurality of video clips, wherein each respective video clip of the plurality of video clips (i) comprises a plurality of consecutive image frames and (ii) is selected based on the corresponding frame content scores of the plurality of consecutive image frames of the respective video clip;

determining, for each respective video clip of the plurality of video clips, a corresponding clip content score based on the corresponding frame content scores of the plurality of consecutive image frames of the respective video clip;

determining, for each respective video clip of the plurality of video clips, a corresponding clip diversity embedding that provides a latent space representation of a visual content of the respective video clip by processing at least one of the plurality of consecutive image frames of the respective video clip by a machine learning model;

determining, for each respective video clip of the plurality of video clips, a corresponding clip diversity score that represents a difference of the visual content of the respective video clip relative to other video clips of the plurality of video clips by comparing the corresponding clip diversity embedding of the respective video clip to the corresponding clip diversity embeddings of the other video clips; and generating a highlight video comprising (i) the plurality of video clips and (ii) a representation of a ranking of the plurality of video clips, wherein the ranking is based on the corresponding clip content score of each respective video clip of the plurality of video clips and the corresponding clip diversity score of each respective video clip.

20. A non-transitory computer-readable medium having stored thereon instructions that, when executed by a computing device, cause the computing device to perform operations comprising:

obtaining a video comprising a plurality of image frames;

determining, for each respective image frame of the plurality of image frames, a corresponding frame content score based on a visual content of the respective image frame;

selecting, from the plurality of image frames, a plurality of video clips, wherein each respective video clip of the plurality of video clips (i) comprises a plurality of consecutive image frames and (ii) is selected based on the corresponding frame content scores of the plurality of consecutive image frames of the respective video clip;

determining, for each respective video clip of the plurality of video clips, a corresponding clip content score based on the corresponding frame content scores of the plurality of consecutive image frames of the respective video clip;

determining, for each respective video clip of the plurality of video clips, a corresponding clip diversity embedding that provides a latent space representation of a visual content of the respective video clip by processing at least one of the plurality of consecutive image frames of the respective video clip by a machine learning model;

determining, for each respective video clip of the plurality of video clips, a corresponding clip diversity score that represents a difference of the visual content of the respective video clip relative to other video clips of the plurality of video clips by comparing the corresponding clip diversity embedding of the respective video clip to the corresponding clip diversity embeddings of the other video clips; and generating a highlight video comprising (i) the plurality of video clips and (ii) a representation of a ranking of the plurality of video clips, wherein the ranking is based on the corresponding clip content score of each respective video clip of the plurality of video clips and the corresponding clip diversity score of each respective video clip.

* * * * *